Dec. 4, 1962    H. J. CONRAD    3,066,476
ARRANGEMENT FOR CONVERTING A RECIPROCATORY
MOVEMENT INTO A ROTARY MOVEMENT
Filed Jan. 30, 1961    10 Sheets-Sheet 1

Inventor:

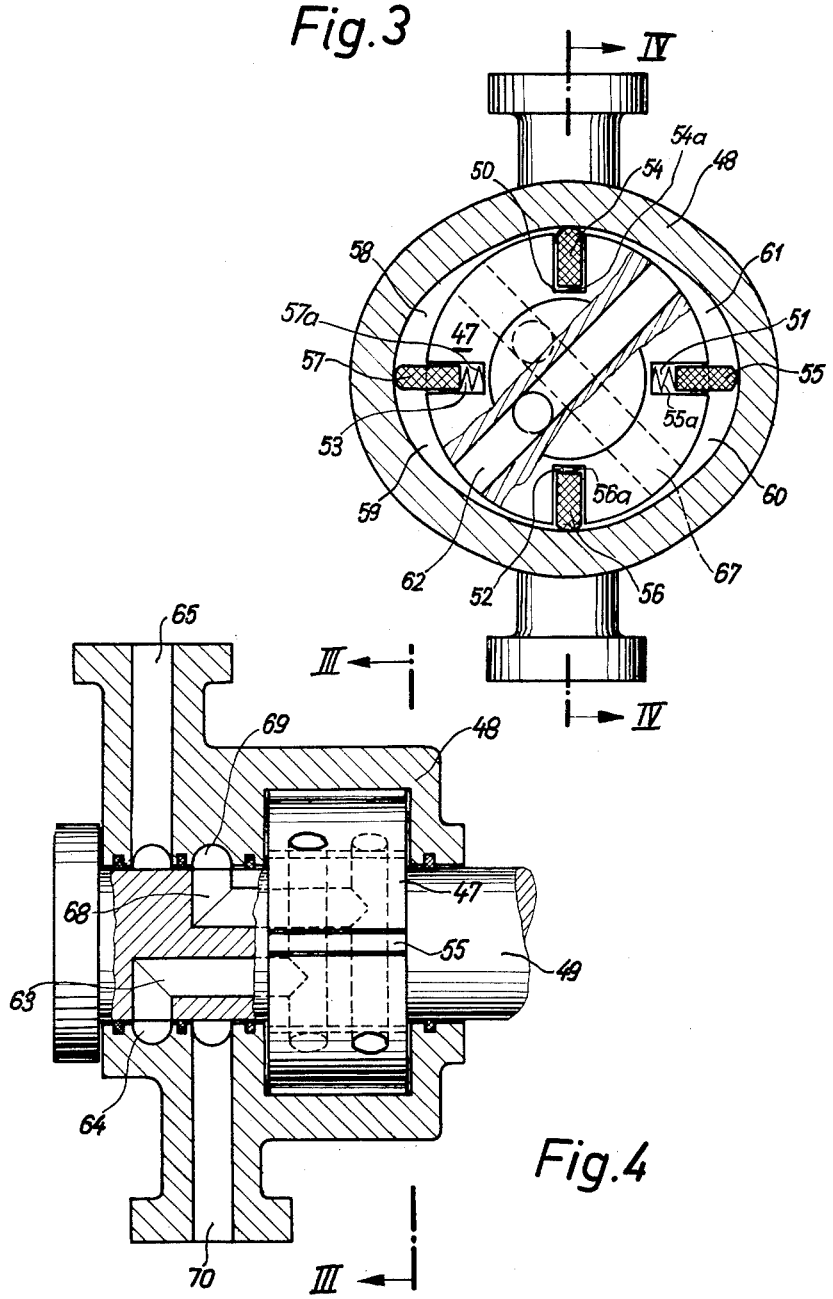

Dec. 4, 1962 H. J. CONRAD 3,066,476
ARRANGEMENT FOR CONVERTING A RECIPROCATORY
MOVEMENT INTO A ROTARY MOVEMENT
Filed Jan. 30, 1961 10 Sheets-Sheet 3

Dec. 4, 1962 H. J. CONRAD 3,066,476
ARRANGEMENT FOR CONVERTING A RECIPROCATORY
MOVEMENT INTO A ROTARY MOVEMENT
Filed Jan. 30, 1961 10 Sheets-Sheet 5

Dec. 4, 1962 H. J. CONRAD 3,066,476
ARRANGEMENT FOR CONVERTING A RECIPROCATORY
MOVEMENT INTO A ROTARY MOVEMENT
Filed Jan. 30, 1961 10 Sheets-Sheet 6
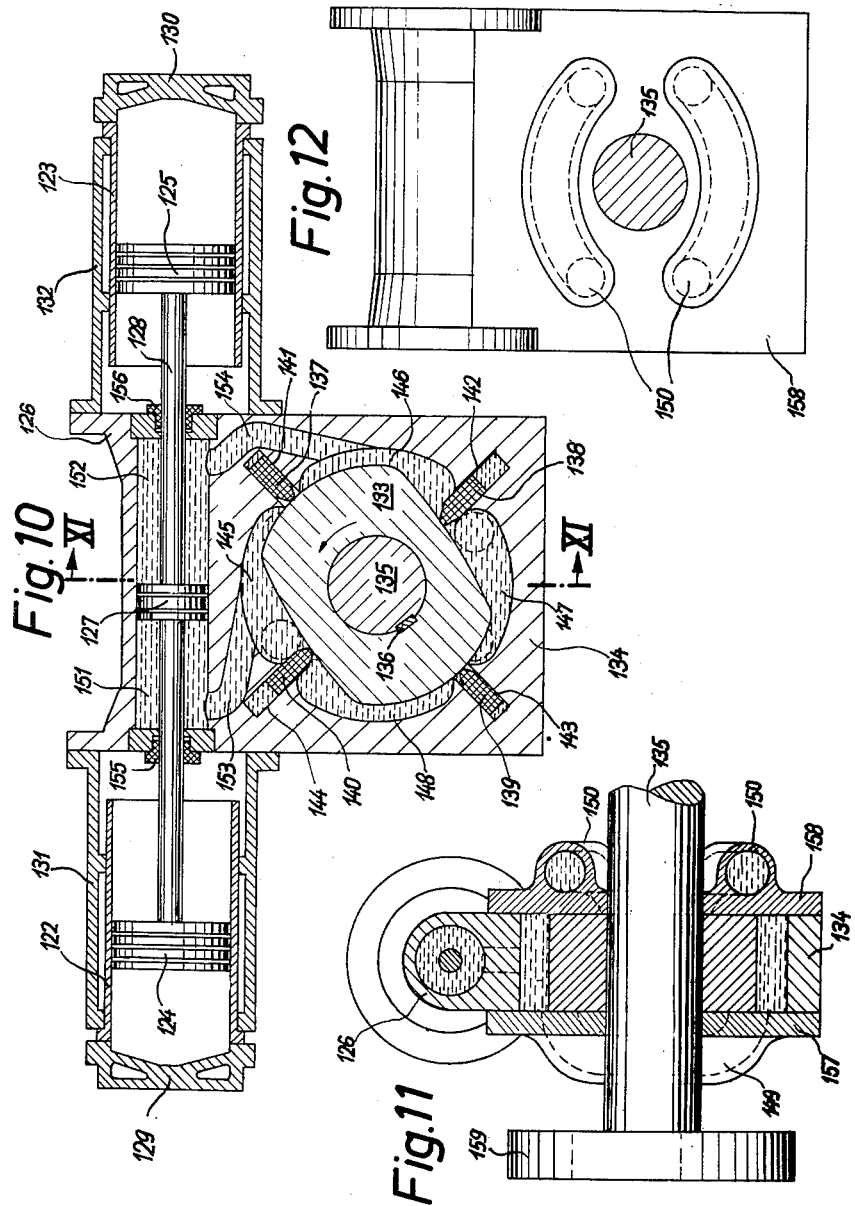

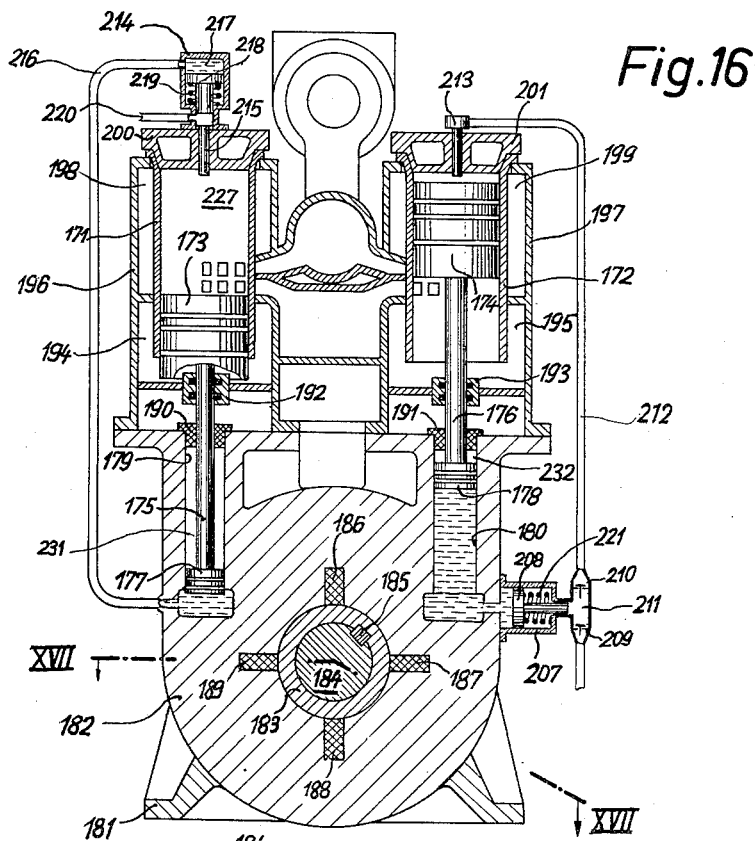
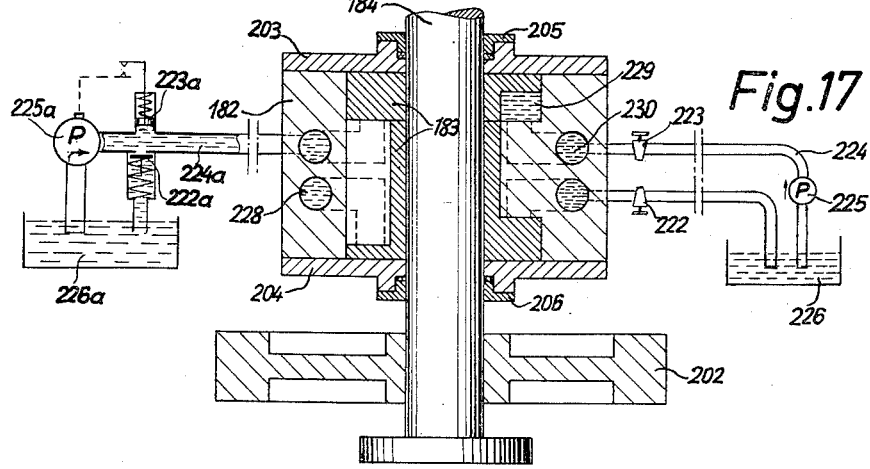

Dec. 4, 1962  H. J. CONRAD  3,066,476
ARRANGEMENT FOR CONVERTING A RECIPROCATORY
MOVEMENT INTO A ROTARY MOVEMENT
Filed Jan. 30, 1961  10 Sheets-Sheet 10
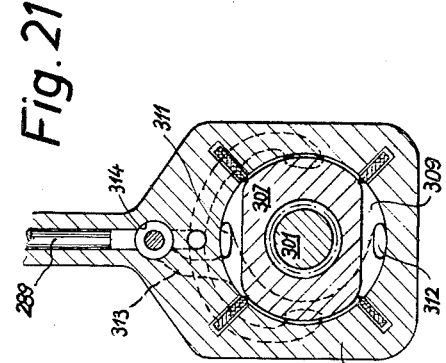
Fig. 21
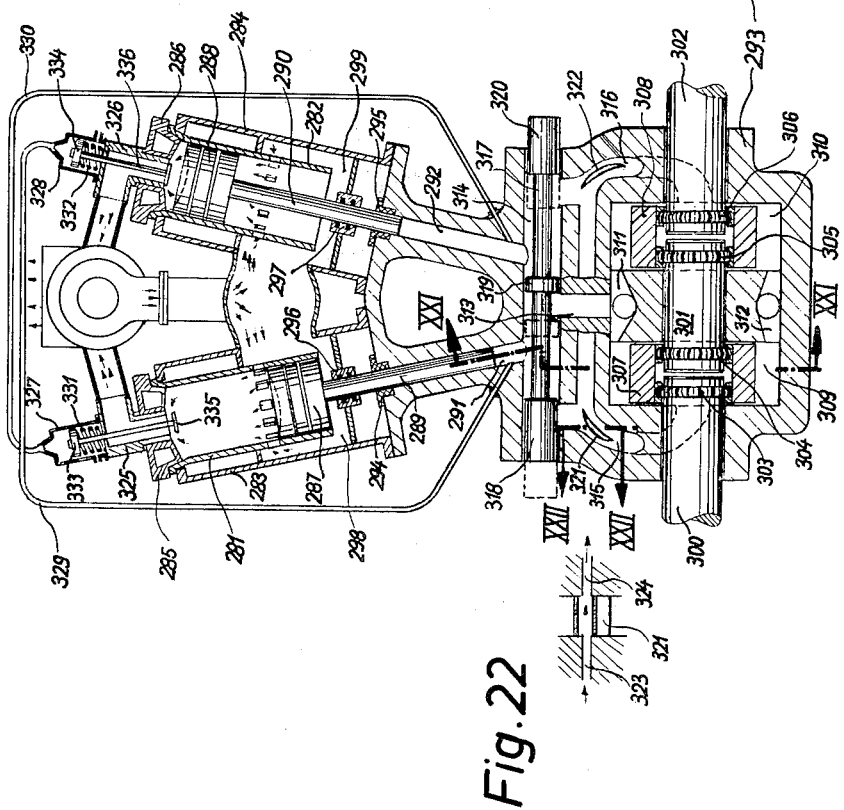
Fig. 20
Fig. 22

United States Patent Office 3,066,476
Patented Dec. 4, 1962

3,066,476
ARRANGEMENT FOR CONVERTING A RECIPROCATORY MOVEMENT INTO A ROTARY MOVEMENT
Hans Joachim Conrad, Essen, Germany, assignor to Beteiligungs- und Patentverwaltungsgesellschaft mit beschränkter Haftung, Essen, Germany
Filed Jan. 30, 1961, Ser. No. 85,914
Claims priority, application Germany Feb. 6, 1960
15 Claims. (Cl. 60—19)

The present invention relates to an arrangement for hydrostatically converting a reciprocatory movement into a rotary movement and also includes an arrangement for converting a rotary movement into a reciprocatory movement. The problem of converting a reciprocatory movement into a rotary movement is one of the fundamental problems in mechanics. This problem is generally solved by applying the well-proved crank drive system. With such a crank drive system, as is well known, the connecting rod represents the power transmitting member between the reciprocating machine element and the crank pin or crank of the rotating machine element which is mostly designed as crank shaft. The known mechanical crank drive, however, has the characteristic that each complete back and forth stroke of the reciprocating machine element, for instance of the piston of a piston engine, requires a complete rotation of the crank shaft by 360°. In this connection, a certain definite position of the rotating machine element corresponds to each position of the reciprocating machine element.

In addition to the above, due to the connection between the reciprocating machine element and the rotary machine element by means of the connecting rod, the mechanical crank drive is structurally forced to adopt a certain design. Thus, for instance, with a piston engine, the crank shaft must occupy a certain position with regard to the working cylinders. It is a matter of course that this necessary coordination of reciprocating and rotating machine elements with the mechanical crank drive is not always desirable. Due to the fact that this peculiarity of the mechanical crank drive in many instances handicaps the designer in his selection of the construction, various efforts have been made in finding ways and means which would permit arranging the rotary machine elements structurally independently of the reciprocating machine element. Thus, for instance, instead of mechanical power transmitting means, also driving mechanisms have ben employed by means of which the work is hydraulically or pneumatically transmitted from the driving engine to the power consumer. Thus, driving mechanisms are known according to which the reciprocating piston of a piston operable internal combustion engine drives a compressor which furnishes compressed air to a subsequent power furnishing compressed air motor, or the compressed air is furnished for instance to air cushioned free piston type internal combustion engines which likewise produce gas under pressure for a secondary engine yielding a torque while the pressure of the working medium is converted into energy of motion.

While with all of the above mentioned engine types the reciprocating machine element may be arranged to a considerable extent independently of the rotary machine element, these known driving mechanisms can be built only at a relatively high cost. Moreover, their mechanical degree of efficiency which is determined by the degree of efficiency of the compressor and of the motor, is considerably lower than that of driving mechanisms with purely mechanical power transmission but a crank drive.

Therefore, also devices have been suggested which, while employing hydraulic means, have retained the fundamental principle of the well-proved crank drive while replacing the connecting rod determining the construction of this machine element, by a liquid column for transmitting the power between the reciprocating and rotating machine parts. With these devices for converting a reciprocating movement into a rotary movement, a reciprocable displacement member connected to the reciprocating part communicates through a fluid filled chamber with a rotary piston with a rotating displacement member while the stroke volume of the reciprocable displacement member equals the stroke volume of the rotary displacement member in the common liquid filled chamber interconnecting the two displacement members.

Similar to the mechanical crank drive, also with this arrangement in which one of the displacement members has to follow the movement of the other displacement member in view of the incompressibility of the liquid, each position of the rotary displacement member has associated therewith a definite position of the reciprocable displacement member and vice versa. However, inasmuch as the liquid column interconnecting the two displacement members, contrary to the connecting rod of a mechanical crank drive, can transmit pressure forces only and no pulling forces, it is necessary with these devices that at all operative positions, the displacement members will be pressed against the liquid.

For all practical purposes, the various above mentioned suggestions have not been adopted in practice.

It is, therefore, an object of the present invention to show a new way of hydraulically transmitting forces and movements between reciprocating machine elements, which will make it posible to realize in a practical manner devices of the above mentioned type and which will additionally have a considerable advantage over heretofore known mechanical crank drives.

It is another object of this invention to provide an arrangement for converting a reciprocating movement into a rotary movement, which will avoid the periodically alternating load alternating as to direction and magnitude and acting upon the bearings of heretofore known mechanical crank drives and the above mentioned hydraulic devices, thereby making it posible to relieve the bearings for the rotary displacement member.

These and other objects and advantages of the invention will appear more clearly from the following specification in connection with the accompanying drawings, in which:

FIG. 3 illustrates a cross section through a rotary displacement system receiving the pressure fluid through its shaft.

FIG. 4 is a section along the line IV—IV of FIG. 3.

FIG. 10 is a cross section through a two-cylinder group of an internal combustion engine in which two working pistons and a double acting fluid pressure operable piston are mounted on a common connecting rod.

FIG. 11 is a section along the line XI—XI of FIG. 10.

FIG. 12 is a view of the central portion of the device according to FIGS. 10 and 11.

FIG. 16 is a transverse section through a two-cylinder group of a two-stroke cycle engine with reverse scavenging, in which the sliding members sealing the rotary piston move in axial direction rather than in radial direction.

FIG. 17 is a section along the line XVII—XVII of FIG. 16.

FIG. 20 is a transverse section through a two-cylinder group of an internal combustion engine, in which the outlet valves are controlled by hydraulic means.

FIG. 21 is a section along the line XXI—XXI of FIG. 20.

FIG. 22 is a section along the line XXII—XXII of FIG. 20.

*General Arrangement*

Figure 1:
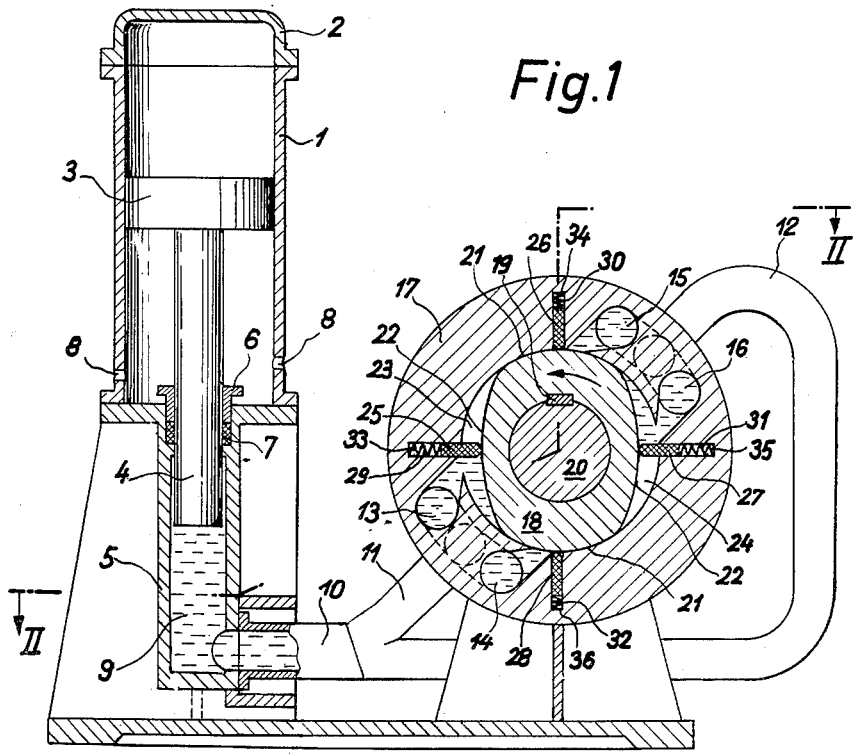
FIG. 1 illustrates an internal combustion engine provided with a device according to the invention for converting a reciprocating movement of the piston into a rotary movement.

The present invention is characterized primarily in that the pressure fluid displaced by the reciprocating piston is split up into two or more partial flows which act upon the rotary piston in such a way that the radial pressure forces exerted by the pressure fluid upon the rotating displacing member balance each other. The rotary piston of an arrangement according to the present invention is journalled in a housing in which due to appropriate shaping of the rotary piston and the housing and due to the employment of sealing elements sealing the annular chamber between rotary piston and housing, pressure chambers are formed in which during the rotation of the rotary piston pressure fluid alternately enters and is displaced. In this connection, the pressure chambers which communicate with the pressure chamber of a reciprocating displacing member, and in which at the same time the same pressure prevails, are located radially offset to each other or in the corners of an equi-lateral polygon. The feeding lines to the pressure chambers are advantageously arranged in that machine part which also receives the sealing elements forming the pressure chambers.

The employment of an arrangement according to the present invention not only gives the designer great liberty in the arrangement of reciprocating and rotating machine elements while eliminating all disturbing bearing forces but makes it possible by correspondingly shaping the rotary displacing member and the housing receiving the same, to adapt that part of the arrangement which furnishes the rotary movement to the course of the reciprocating part of the arrangement thereby making it possible to obtain the most favorable velocity and accelerating conditions.

By appropriately shaping the rotary piston and the rotary piston housing, it is furthermore possible properly to control the problem of sealing the fluid flow chambers under pressure with regard to fluid flow chambers under no pressure or under different pressure. If the seal of the individual fluid chambers relative to each other is effected by sealing elements sliding on the end face or side surface of the rotary piston or on the inner end or side wall of the rotary piston housing, these sealing elements may be acted upon by pressure fluid in such a way that the fluid pressure will press the same against the sealing surface thereby assuring the necessary pressing force. If a rotary piston is simultaneously acted upon by a plurality of reciprocating displacing members, leakage losses may partly be compensated for by causing the leaked-out liquid of one system to enter the other system and vice versa. As power transmitting fluid, any desired fluid, preferably oil and glycerine may be employed. The fluid should have good lubricating properties in order to assure that simultaneously all movable parts of the arrangement according to the invention will automatically be lubricated. The liquid power transmitting means is also suitable to conduct away the heat which might be created in the device. In instances in which it is necessary to conduct away relatively large quantities of heat, it is necessary to provide for sufficient cooling at any desired point.

In conformity with the invention, means for discharging the pressure fluid may be provided. By applying such means, the device according to the invention may be employed not only for converting a reciprocating movement into a rotary movement or vice versa, but the arrangement according to the invention may also be employed as coupling because after discharging the working fluid, the power transmission between reciprocating and rotating machine part will be interrupted.

According to a further development of the invention, a plurality of parallelly adjacently arranged reciprocating displacing members may act upon one and the same rotary displacing member. In many instances, advantageously, a reciprocating displacing member may operatively be connected to a plurality of rotating displacing members. A complete stroke of the reciprocable displacing member must not necessarily have associated therewith a quarter of a revolution of the rotating displacing members. When employing a corresponding number of pressure chambers, it is rather possible that the angle of rotation of the rotary displacing member, which angle corresponds to a stroke, amount to any desired portion of a total revolution of the rotary displacing member. The rotary piston and the rotary piston housing may be designed in various manners. Thus, for instance, also rotary pistons may be employed which rotate as circular round disc-shaped rotors in an elliptical chamber with regard to the rotor, while the sealing of the individual pressure chambers is effected by slides which are displaced radially in slots in the rotor itself against spring pressure and/or fluid pressure.

The reciprocating displacing member may in its simplest form be designed as a cylindrical piston or plunger.

With the arrangement according to the present invention, similar to the mechanical crank drive, it is possible to reverse the direction of rotation of the rotating part. According to a further development of the invention, this may be effected in a very simple manner by reversing the connecting lines, for instance of two reciprocable pistons actuating a rotating piston.

The invention is furthermore concerned with the problem of making the arrangement according to the invention also applicable for converting a reciprocating movement into a rotary movement also when the reciprocating piston does not during its entire reciprocating movement exert a pressure upon the pressure fluid. This feature relates to the employment of the arrangement according to the invention as part of an internal combustion engine.

According to this embodiment of the invention, two pistons of an internal combustion engine are connected to a connecting rod which carries a double acting reciprocating piston in a pump housing. The two sides of the pump housing communicate with the pressure chambers of the housing, in which the rotary piston or pistons is or are arranged, in such a way that again the radially and axially occurring pressure forces will balance each other. Due to the fact that in this instance a double acting reciprocating piston is employed for the pressure fluid, which on both sides has equally effective surfaces which are continuously acted upon, the position also of the pistons of the two internal combustion cylinders relative to each other and relative to the rotary piston will be determined at any time. A lifting off of the piston from the pressure fluid cannot occur. An internal combustion engine may be composed of two or more cylinder pairs of the above mentioned type. In this connection, it is irrelevant whether such engine is of the two-cycle or four-cycle type because when employing the embodiment of the invention as just mentioned without the employment of special auxiliary means, the pistons of the internal combustion engines are able to carry out a suction stroke for taking in the combustion air or an air-gas mixture.

According to a further development of the invention, the working piston of the internal combustion engine is cooled by pressure fluid of the driving mechanism. The pressure fluid withdrawn from this purpose from the driving mechanism may after being cooled again in a heat exchanger be conveyed to an automatically effective oil compensating device for assuring the uniform running.

If desired, the inlet and outlet valves of the internal combustion engine may also be actuated hydrostatically while employing the pressure fluid of the driving mechanism according to the invention. In this instance, the actuation of the valves may be controlled by means known per se in conformity with the valve control periods.

Finally, also the fuel injection pump may be actuated hydrostatically by means of the pressure fluid of the driving mechanism. Also in this instance the control may be effected by means known per se in conformity with the injection periods. The injection pump may be combined with the injection valves or injection nozzle to a unit.

Structural Arrangement

Figure 2:
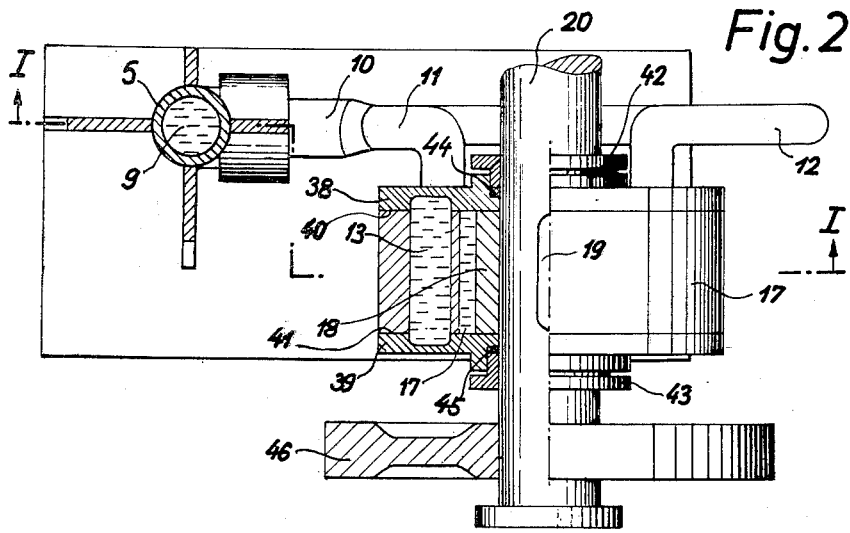
FIG. 2 represents a section taken along the line II—II of FIG. 1.

Referring now to the drawings in detail and FIGS. 1 and 2 thereof in particular, the internal combustion engine illustrated therein comprises a cylinder 1 having its upper end closed by a cylinder lid 2. Reciprocably mounted in cylinder 1 is a reciprocating piston 3 provided with an extension 4 forming a plunger extending into the plunger housing 5. The annular gap between the extension 4 of piston 3 and the upper portion of the plunger housing 5 is sealed by a stuffing box 6 pressing a seal 7 against the corresponding sealing surfaces. In the chamber below the piston 3 the wall of the cylinder 1 is provided with openings 8 for admitting air into and discharging air from the cylinder chamber below the piston 3 during the upward and downward movement respectively of the piston. The inner chamber 9 of the plunger housing 5 containing a fluid under pressure communicates through a conduit 10 with the supply passages 11 and 12 and through said passages 11 and 12 also with the pressure chambers 13 and 14 and 15 and 16 of a rotary piston housing 17. The rotary piston housing 17 has rotatably journalled therein a rotary piston 18 which is keyed to a driving shaft 20 by means of a key 19. The cross section of the rotary piston 18 has an elliptical shape. Rotary piston 18 is adapted to slide on the hollow cylindrical inner surfaces of the rotary piston housing 17 by means of its surfaces 21 forming part of the surface of a cylinder of the same diameter as the inner chamber of housing 17. Between the somewhat flattened lateral surfaces 22 of the rotary piston 18 and the inner circumferential surface of the rotary piston housing 17 there are provided chambers 23, 24 which have a crescent-shaped cross section and which during the rotation of the rotary piston 18 alternately communicate with the pressure chambers 13, 14 and 15, 16 respectively in the rotary piston housing 17. The rotary piston 18 furthermore cooperates with the sealing elements 25, 26, 27 and 28 which are radially displaceably mounted in slits 33, 34, 35 and 36 in housing 17 and are adapted to be displaced in said slits against the thrust of springs 29, 30, 31 and 32. In the crescent-shaped chambers 23, 24 between the rotary piston 18, the rotary piston housing 17 and the sealing elements 25, 26, 27 and 28 pressure will build up periodically and in an alternating manner, so that said crescent-shaped chambers will form alternate pressure chambers in which the pressure of the pressure fluid will become effective.

The sealing elements 25, 26, 27 and 28 are provided with passages through which the pressure fluid in the pressure chambers can pass into the slits 33, 34, 35 and 36. The rotary piston housing 17 is laterally closed by lids 38, 39 which are fixedly connected to the rotary piston housing 17 in any convenient manner, for instance, by tie rods (not shown). The end faces 40, 41 of said lids 38, 39 have with the lateral end faces of rotary piston 18 only sufficient running play to permit the rotary piston 18 to rotate freely. By selecting a corresponding fit, it is possible to assure that at said surfaces a seal will be obtained which will assure that no material losses in the liquid or fluid will occur. If desired, additional sealing means may be provided. The input shaft 20 is sealed toward the outside by stuffing boxes 42, 43 with sealing material 44, 45.

For purposes of increasing the fly wheel masses the input shaft 20 has mounted thereon a fly wheel 46.

Operation of Arrangement of FIGS. 1 and 2

When the internal combustion engine performs its working stroke, the reciprocable piston 3 and the plunger-like extension 4 thereof move downwardly with regard to FIG. 1 while the plunger 4 displaces the pressure fluid in plunger cylinder 9 and presses said fluid through conduit 10 and feeding passages 11 and 12 into the pressure chambers 13, 14 and 15, 16. The hydrostatic pressure of the pressure fluid now acts upon the rotary piston 18 and rotates the same in the direction of the arrow. When the rotary piston 18 has rotated by 90°, the sealing elements 25 and 27 will against the thrust of springs 29, 30 be radially moved into the respective slits 33, 35 of housing 17 so that the cylindrical surface 21 of rotary piston 18 will be flush with the inner wall of chambers 23, 24. At the same time the sealing elements 26 and 28 will in radial direction move out of the respective slits 34 and 36 of housing 17 and will thus displace the oil in pressure chambers 23, 24 into the inner chamber 9 of plunger cylinder 5. In this way the plunger-like extension 4 and together therewith piston 3 of the internal combustion engine will be returned to their starting position. When the pressure chambers in the rotary piston housing are completely filled, i.e. when piston 3 and plunger 4 have reached their lower dead center point, the volume of the pressure chambers in the rotary piston housing must equal the volume of the liquid displaced from the plunger cylinder 5. When, after a revolution of the rotary piston by 180° from the position shown in FIG. 1, the entire pressure fluid has been displaced from the pressure chambers again into the inner chamber 9 of plunger cylinder 5, piston 3 must have reached its upper dead center point. Thus, when this arrangement according to the invention, two complete upward and downward strokes of the reciprocable piston correspond to one revolution of the rotary piston 18.

Similar to all hydrostatic drives, also with the arrangement according to the present invention, disregarding the flow and friction losses, the rule applies that, at each instant, for the stroke volume of piston 3 in cylinder 1, for the stroke volume of the plunger 4 in the plunger cylinder 5, and for the respective volume of the pressure chambers in the rotary piston housing formed by the rotary piston, the integral of the pressure function plotted over the volume must be the same. Flow friction and leakage losses determine the degree of efficiency of the device according to the present invention.

With the embodiment of the rotary piston part of the device according to the invention and illustrated in FIGS. 3 and 4, a rotary piston 47 of circular cross section rotates in an inner chamber of the rotary piston housing 48 which latter has a cross section of oval shape. The rotary piston 47 which is connected to input shaft 49, for instance, by being shrunk thereto, is provided with radial slits 50, 51, 52, 53, in which are slidably mounted sealing members 54, 55, 56 and 57 resting upon the rotary piston by springs 54a, 55a, 56a, and 57a. The sealing elements 54, 55, 56 and 57 subdividing the crescent-shaped hollow passages between the inner chamber of the rotary piston housing 48, which inner chamber is of oval cross sectional shape, and the cylindrical rotary piston 57 into four pressure chambers. Of these pressure chambers, the pressure chambers 59 and 61 communicate through bores 62 and 63, the annular passage 64, and passage 65 with a reciprocable displacing member (not shown). The pressure chambers 58 and 60 communicate through bores 67 and 68, annular passage 69 and a passage 70 with a second reciprocable displacement member (not shown). The operation of this arrangement is the same as that described in connection with FIGS. 1 and 2.

Figure 5:
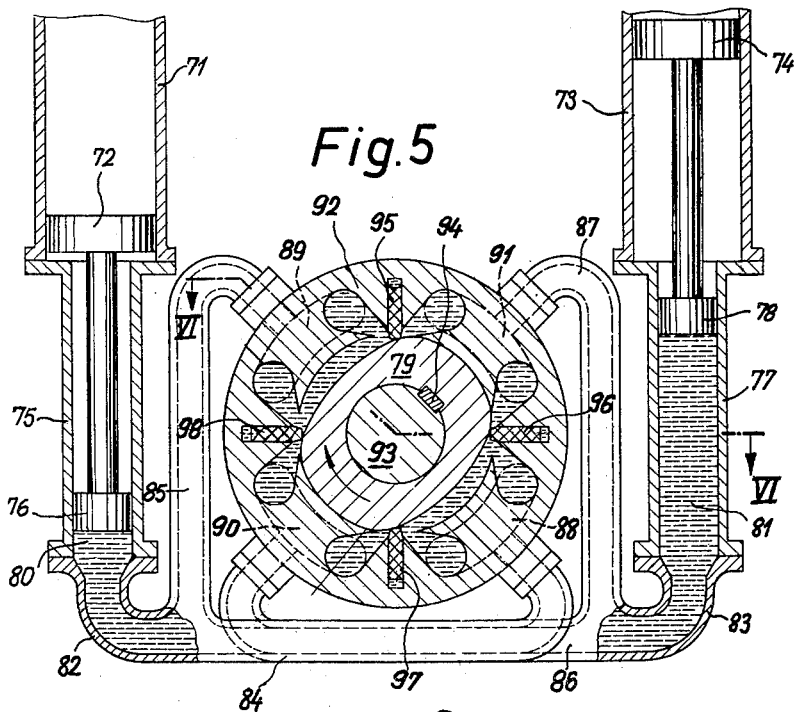
FIG. 5 is a cross section through a device according to the invention in which two reciprocable pistons act upon a rotary piston.
Figure 6:
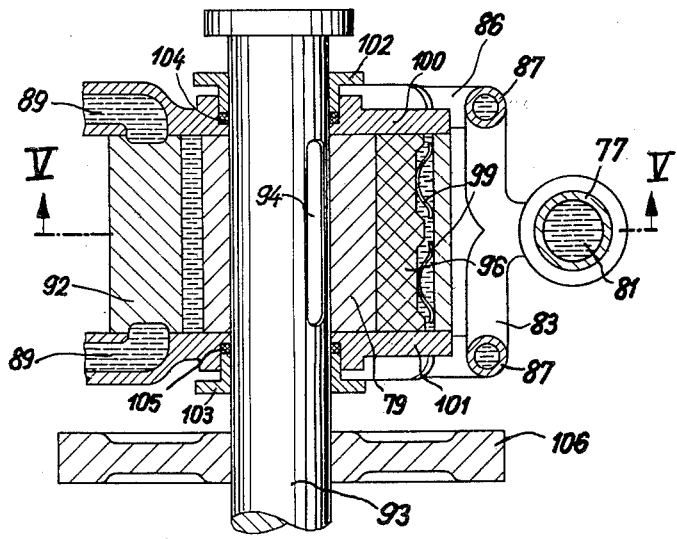
FIG. 6 is a section along the line VI—VI of FIG. 5.

Referring now to FIGS. 5 and 6, the arrangement illustrated therein likewise comprises two reciprocable displacement members acting upon a rotary piston. More specifically, in the two-cylinder combustion engine of FIGS. 5 and 6, a piston 72 is reciprocably mounted in a cylinder 71, whereas a piston 74 is reciprocably mounted in a cylinder 73. The piston 72 is connected to a piston 76 reciprocable in a pressure cylinder 75, and the piston 74 is connected to a piston 78 reciprocable in the pressure cylinder 77. The pistons 76 and 78 in their turn are adapted to act upon a rotary piston 79.

In the particular showing of FIG. 5, piston 72 in cylinder 71 has reached its lower dead center point, while piston 74 has reached its upper dead center point. The pressure chambers 80 and 81 of the cylinders 75 and 77 respectively communicate through conduits 82 and 83 and branch lines 84, 85 and 86, 87 with the supply passages 88, 89 and 90, 91 respectively of the rotary piston housing 92. The rotary piston 79 is adapted to rotate in a cylindrical inner chamber of the rotary piston housing 92. Rotary piston 79 is coaxially journalled on an output shaft 93 and is keyed thereto by means of a key 94. The shape of the rotary piston 79 substantially corresponds to that of rotary piston 18 of FIGS. 1 and 2.

As will be evident from FIG. 5, rotary piston 79 cooperates with four sealing slides 95, 96, 97 and 98 which are offset with regard to each other by 90°. The said sealing slides 95 to 98 are movable in radial slits in housing 92 and by the thrust of springs 99 and the fluid pressure superimposed upon said thrust and conveyed through passages (e.g. passages 162 shown in FIG. 13) into the respective chambers are pressed against the circumferential surface of the rotary piston. Similar to the embodiment of FIGS. 1 and 2, the rotary piston housing is laterally closed by lids 100 and 101 which are connected to the housing 92 in any convenient manner, for instance, by clamping screws. The driving shaft 93 is sealed toward the interior of the housing by means of stuffing boxes 102 and 103 and seals 104 and 105. A fly wheel 106 keyed to input shaft 93 serves for maintaining the necessary uniformity of rotation of the rotary piston 79. In the particular position occupied by the rotary piston 79 and the reciprocating pistons 76 and 78, as illustrated in FIGS. 5 and 6, the pressure fluid displaced by the reciprocating piston 76 has been conveyed into the pressure chambers communicating with the feeding passages 88 and 89, whereas pressure fluid has been displaced from the pressure chambers communicating with passages 90 and 91. This displacement has been effected through branch lines 86 and 87 and conduit 83 into the pressure chamber 81 of cylinder 77. The volume of the pressure chambers corresponds to the stroke volume displacement by the reciprocable pistons.

If, for instance, due to the energy stored in the fly wheel 106, the rotary piston 79 continues to rotate in the direction of the arrow, pressure fluid is stripped off on the sealing elements 96 and 98 from the pressure chambers communicating with the feeding passages 88 and 89 and is pressed back into the cylinder 75. At the same time, during the downward stroke of the reciprocable piston 78, pressure fluid is pressed from cylinder 77 into the now-forming pressure chambers offset by 90° and communicating with the feeding passages 90 and 91. After a rotation of the rotary piston 79 by 90°, the total stroke volume of cylinder 77 has entered the said pressure chambers. At this time, the reciprocating piston 78 will occupy its lower dead center point, whereas the reciprocating piston 79 will occupy its upper dead center point.

This arrangement of the invention has the advantage that fluid losses caused by incomplete sealing of the rotary piston may pass, for instance, from the system of the reciprocating piston 76, only into the system of the reciprocating piston 78, and vice versa. Inasmuch as the two cylinders 75 and 77 are associated with one rotary piston, the leakage losses for both cylinder units will practically be the same and will balance each other.

In instances in which a relatively high increase in the temperature of the pressure fluid occurs, the cylinders 75 and 77 or the conduits 82 and 83 may be equipped with cooling devices, e.g. cooling jackets.

If desired, the rotary piston 79 and/or the rotary piston housing 92 may have a separate cooling device. In some instances, it may be advantageous for purposes of obtaining a loss-free construction of the entire device to build the reciprocable displacing members likewise into the housing of the rotary displacement member in order to obtain as short and thereby as loss-free a connecting lines as possible between the reciprocating displacement members and the rotary displacement member. Advantageously, oil or any other liquid with good lubricating properties will be selected as pressure fluid. In this connection, it is advantageous to select such a pressure fluid which has a minimum of compressability, and for purposes of reducing the reciprocating masses also to see to it that the specific weight of the pressure fluid is as low as possible.

The above described embodiments of an arrangement according to the present invention are so designed that the hollow chambers in the slits provided in the rotary piston housing or the rotary piston and formed behind the sealing elements will increase and fill with pressure fluid when the sealing elements slide out of said slits. This however, brings about that a portion of the fluid volume displaced by the reciprocating piston for carrying out the work is lost for performing useful work whereby the degree of efficiency is unfavorably influenced. This unfavorable influence will be avoided by the embodiment of a rotary piston as shown in FIGS. 7, 8 and 9.

Figure 7:
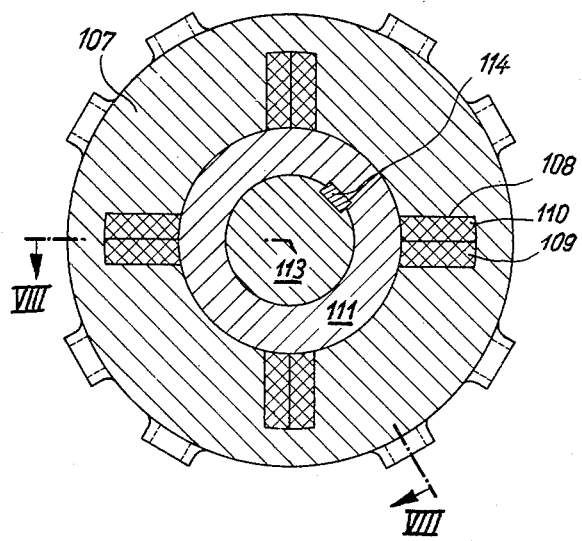
FIG. 7 represents a section through a portion of a device with a modified rotary piston.
Figure 8:
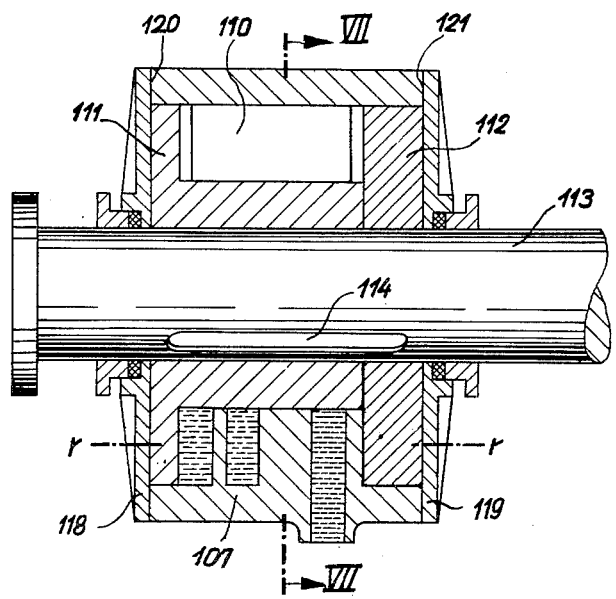
FIG. 8 is a section along the line VIII—VIII of FIG. 7.
Figure 9:
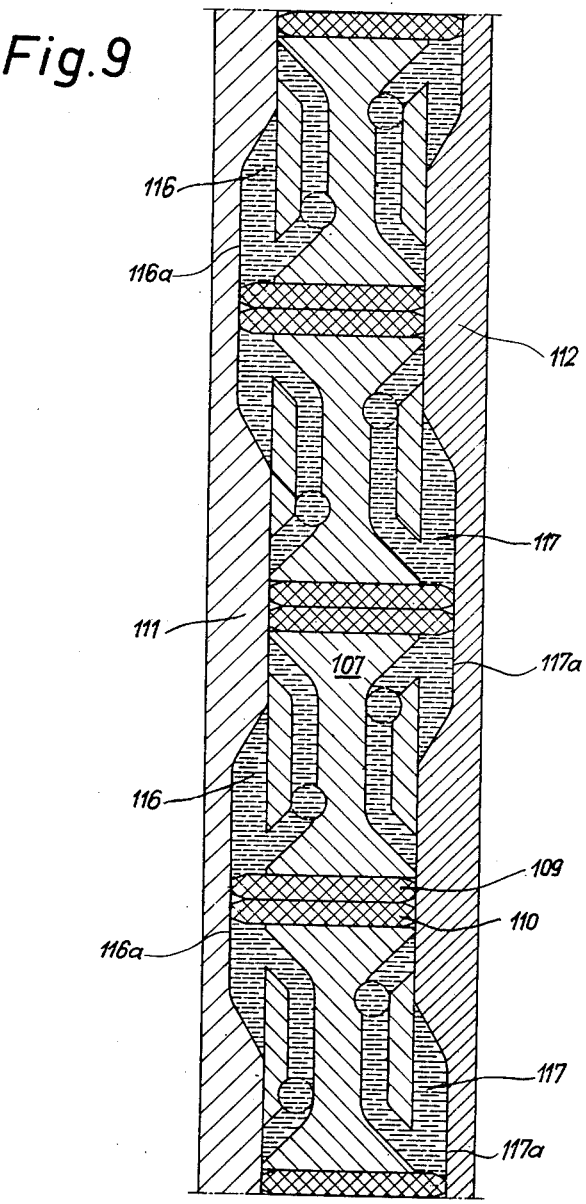
FIG. 9 shows the development of the rotary piston according to FIGS. 7 and 8 and its housing with the radius $r$.

According to the said FIGS. 7, 8 and 9, the rotary piston housing 107 has its inner side provided with radially milled-out sections 108 having respectively reciprocably mounted therein two sealing elements 109 and 110. These sealing elements, however, will in this particular embodiment not reciprocate in radial direction but in axial direction of the rotary piston. The rotary piston comprises two parts, namely, 111 and 112 which are fixedly connected to each other in any convenient manner, for instance, by tie rods. The rotary piston is connected to a shaft 113 by a key 114. Pockets 116a and 116b have been milled into parts 111 and 112 of the rotary piston and, more specifically, in such a way that that confining wall of said pockets, which is perpendicular to the axis of rotation of parts 111 and 112 has always the same axial distance from the opposite wall. The sealing elements 109 and 110 displaceable in axial direction in the rotary piston housing 107 fit precisely between the two confining surfaces of the milled-in pockets, said confining surfaces being perpendicular to the axis of the rotary piston housing. During the rotation of the rotary pistons 111 and 112, the sealing elements, by means of the guides formed by the pockets, are forced to slide back and forth in axial direction. During this operation, the movement of the sealing elements is not initiated by a spring force and is furthermore not caused by the liquid pressure but is brought about merely by the shape of the guiding paths and by the rotation of the rotary piston.

As will be evident from the development of the rotary piston illustrated in FIG. 9, also in this instance, between the rotary piston housing 107, the rotary pistons 111 and 112 and the sealing elements 109 and 110, pressure chambers 116 are formed. The pressure fluid of a displacement member (not illustrated) flows into said pressure chambers 116, and after completed working stroke, due to the continuing movement of the rotary piston, the pressure fluid is again pressed back. The pressure chambers 116 are simultaneously always acted upon by the pressure fluid of a displacement member and in adjacent pressure chambers 117 are acted upon by another displacement member. As a result thereof, it is possible to eliminate the leakage losses to a minimum. Two or more reciprocable displacement members may act upon a rotary displacement member designed in the above mentioned manner.

The rotary piston housing 107 is likewise closed by means of lids 118 and 119 connected to said housing in any convenient manner, for instance, by tie rods. This connection is effected in such a way that they will completely seal at the sealing surfaces 120 and 121, at the rotary pistons 111 and 112, but will still leave sufficient play to allow free rotation of the rotary piston. However, in contrast to the rotary piston housing 107, the rotary piston 111 and 112 itself must have as little running play as possible while furnishing a sufficient sealing effect.

It is well known that with mechanical crank drives the course of the speed and the acceleration of the reciprocating member and the conecting rod of the crank drive is determined by the so-called rod ratio, i.e. by the ratio of the length of the connecting rod to the stroke of the reciprocating member. In contrast thereto, with an arrangement of rotary piston and rotary piston housing in conformity with the present invention, the speed and acceleration conditions may be changed within certain limits at random by varying the shape of the pressure chambers or pockets.

With the embodiment according to FIGS. 7 to 9, however, the course of the speed conditions and of the conditions of acceleration are determined in so far as the pockets milled into the rotary piston housing 107 do not follow a sine-shaped curve and inasmuch as, for reasons of construction, the tips of the curves are cut off. It would, however, be possible, for instance, to shape the pockets milled into the rotary piston housing 107 approximately along a sine curve if the sealing slides 109 and 110 are designed telescopically or if their end faces would have inserted thereinto longitudinally displaceable and resiliently arranged sealing strips which, during the rotation of the rotor, will protrude more or less and/or will be acted upon by pressure fluid on that side which is located opposite the sealing end face.

If the conduit system between the reciprocable displacement member of the device and the rotary piston is provided with means for discharging liquid, it is also possible at the same time to employ the device as coupling. In such an instance, the input and output may be separated from each other by discharging pressure fluid. By reversing the connecting conduits between the parallelly working pressure chambers of the rotary piston and their reciprocable displacement members, it is also possible to reverse the direction of rotation of the rotary piston, or to determine the direction of rotation thereof if it is desired to start from any desired position of said rotary piston.

With the internal combustion engine illustrated in FIGS. 10, 11 and 12, pistons 124 and 125 reciprocate in cylinders 122 and 123. Said pistons are, through a common connecting rod 128, connected to a double-acting piston 127 reciprocably mounted in cylinder 126. The cylinders 122 and 123 are closed by cylinder lids 129 and 130 and are provided with cooling jackets 131 and 132.

Inasmuch as it is irrelevant whether the illustrated internal combustion engines are of the four-stroke cycle or the two-stroke cycle type or whether the engine is valve or slot controlled, the inlet and outlet members or valves have not been illustrated.

As will be seen from FIGS. 10 and 11, cylinder 126 is provided with an extension 134 forming the housing for the rotary piston 133 which latter is keyed to the output shaft 135 by a key 136. In said housing 134 and movable radially with regard to output shaft 135 are four slide-like sealing members 137, 138, 139 and 140. These sealing members are respectively reciprocable in slits 141, 142, 143 and 144 and sub-divide the annular chamber between rotary piston 133 and housing 134 into four pressure chambers 145, 146, 147, and 148. Of these pressure chambers, the pressure chambers 145 and 147 communicate with each other through passages 149, whereas the pressure chambers 146 and 148 communicate with each other through passages 150. The two pressure chambers 151 and 152 of cylinder 126 which respectively communicate through passages 153 and 154 with the pressure chambers 145 and 147, 146 and 148 are sealed by stuffing boxes 155 and 156 respectively. The rotary piston housing 134 has its sides closed off by lids 157 and 158 (see FIGS. 11 and 12) which are connected to the rotary piston housing 134 by means of tie-rods (not shown) or any other convenient means.

*Operation of Internal Combustion Engine According to FIGS. 10 to 12*

After a combustion has taken place in cylinder 122 and the combustion gas has exploded, the combustion gases act upon piston 124 and through the intervention of connecting rod 128 on the double acting reciprocating piston 127 whereby the power is conveyed to the pressure fluid in pressure chamber 152 of cylinder 126. The pressure fluid passes through passage 154 into the pressure chamber 148 and further through passages 150 in lid 158 into the pressure chamber 146. As a result thereof, the rotary piston 133 is moved in the direction of the arrow. At the same time, the rotary piston presses the pressure fluid from pressure chambers 145 and 147 through passages 149 in lid 157 and passages 153 in rotary piston 134 into the pressure chamber 151 of cylinder 126 whereby the gas in cylinder 123 will be compressed. When a four-stroke cycle engine is employed, it is, however, not under all circumstances necessary that a fresh air load be compressed. If desired, a discharge of the combustion gases may be effected, and the compression in said cylinder may then be effected during the next stroke effected in the same direction. For maintaining the necessary uniformity of the rotary movement there is provided a flywheel 159 (FIG. 11).

Figure 13:
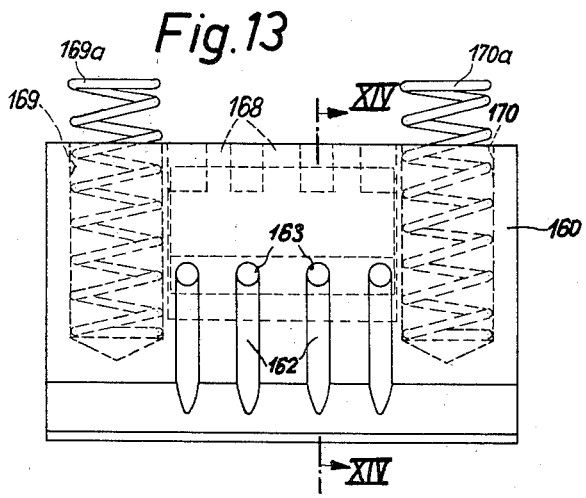
FIG. 13 is a sliding member for sealing the rotary piston illustrated in FIGS. 10 and 11.
Figure 14:
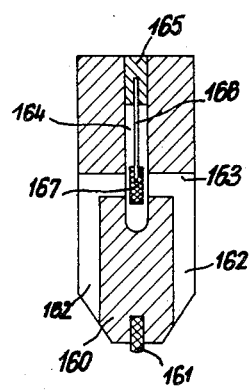
FIG. 14 is a cross section through the sliding member of FIG. 13.
Figures 15, 15A:
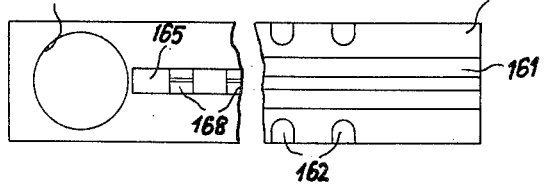
FIG. 15 is a view of the upper side of the sliding member of FIGS. 13 and 14 which guides the sealing strip.
FIG. 15a is a view of the lower side of the sliding member according to FIGS. 13 and 14 which guides the sealing strip.

FIGS. 13, 14 and 15 illustrate a slide serving as sealing element, as it may be employed for instance with the embodiment illustrated in FIGS. 10 to 12. The slide 160 carries a sealing strip 161. The slide 160 is furthermore provided with passages 162 which communicate through bores 163 with a milled-in pocket 164. Mounted in this pocket 164 is a member 165 which by means of a leaf spring 166 carries a valve member 167. The member 165 is provided with passages 168. In addition thereto, the slide 160 has two bores 169 and 170.

*Operation of Slide 160 of FIGS. 13 to 15*

Mounted in bores 169 and 170 are helical springs 169a and 170a which continuously urge the sealing strip 161 to rest against the rotary piston so that two adjacent pressure chambers will be separated from each other during the start of the engine. Pressure fluid will now be able to pass through passages 162 from the respective pressure chamber having the higher pressure so as to lift off the valve member 167 while simultaneously closing the passage to the pressure chamber with the lower pressure. This condition will always be maintained by the valve member 167 connected to leaf spring 166, in such a way that in bores 168, i.e. on that back side of slide 160 which faces the side with the sealing edge there will always be established the higher pressure of the pressure fluid of the two adjacent chambers. This is necessary for a proper sealing of the slide member 160 on the rotary piston 133.

Referring now to FIGS. 16 and 17, these figures illustrate a large two-stroke ship diesel engine which may be operated by heating oil and comprises a group of two cylinders with reverse scavenging. This engine is provided with cylinder bushings 171 and 172 in which are reciprocably mounted pistons 173 and 174 respectively connected by means of connecting rods 175 and 176 to reciprocable pistons 177 and 178 of a hydrostatic drive mechanism. The pistons 177 and 178 reciprocate in cylindrical bores 179 and 180 which form a part of a rotary piston housing 182 provided with a base 181. Rotatably journalled in housing 182 is a rotary piston 183 which is provided with sealing elements or slides 186, 187, 188 and 189 which are reciprocable in axial direction of said rotary piston 183. Rotary piston 183 is keyed by a key 185 to an input shaft 184. However, if desired the piston 183 may be connected to the input shaft in any other convenient manner for instance by a plug-socket connection of the type of an arched tooth clutch. The slides 186, 187, 188 and 189 seal each two adjacent pressure chambers at both sides of the rotary piston with regard to each other.

The bores 179 and 180 are closed by stuffing boxes 190 and 191. Above the stuffing boxes 190 and 191 there are provided two further stuffing boxes 192 and 193 for preventing combustion residues of the heating oil, which might enter into the scavenging boxes 194 and 195, from soiling the stuffing boxes 190 and 191 and the connecting rods 175 and 176 extending through said stuffing boxes.

The housings 196 and 197 not only form a portion of the scavenging boxes 194 and 195 but also at their upper end form the cooling chambers 198 and 199 for the cooling water. The cylinder bushings 171 and 172 are closed by the cylinder lids 200 and 201. The input shaft 184 has connected thereto a fly wheel 202. The rotary piston housing 182 which houses the two reciprocating pistons and the rotary piston is closed at its sides by lids 203 and 204. Mounted in the lids 203 and 204 are stuffing boxes 205 and 206 which seal the housing with regard to the input shaft 184 so as to prevent pressure fluid from escaping.

In the illustrated internal combustion engine, the fuel is injected by hydraulic means. The right-hand side of FIG. 16 shows the engine equipped with a fuel pump 207 adapted to operate by pressure fluid in bore 180 when the reciprocating piston 178 has reached the lower dead center point. The piston 208 of the fuel pump 207 will then convey the fuel from the pressure chamber 211 closed by the check valve 209, 210, through conduit 212 to the injection nozzle 213. The left-hand side of FIG. 16 shows a fuel pump 214 which is combined with the injection nozzle 215 and which is mounted on the cylinder lid 200. The fuel pump 214 communicates through conduit 216 with a bore 179.

*Operation of the Engine According to FIG. 16*

When ignition is effected in the combustion chamber 227, the piston force of piston 173 is by means of the connecting rod 175 conveyed to the reciprocating piston 177 of the hydrostatic drive mechanism. In bore 179 the reciprocating piston 177 will place the pressure fluid under a pressure higher than atmospheric pressure so that the pressure fluid will pass through passage 228 into the pressure chamber (not illustrated) which is formed between the rotary piston housing 182 and the rotary piston 183. As a result thereof, the rotary piston is rotated, and simultaneously pressure fluid will be displaced from the pressure chamber 229 through passages 230 into bore 180. Consequently, the reciprocable piston 178 is raised and through the intervention of connecting rod 176, piston 174 moves upwardly in cylinder bushing 172 whereby the new cylinder charge will be compressed.

When the reciprocating piston 177 has reached its lower dead center point, the pressure of the liquid which has passed through conduit 216 into the pressure chamber 217 will become so high that the piston 218 will be pressed downwardly against the thrust of spring 219, and the fuel drawn in through conduit 220 will be injected by injection nozzle 215 into the combustion chamber of the cylinder bushing.

Fuel pump 207 will work correspondingly when piston 174 and reciprocating piston 178 move downwardly. In other words, piston 208 of fuel pump 207 will against the thrust of spring 221 press the fuel from pressure chamber 211 into the injection nozzle 213 by means of which the fuel will be injected into the combustion chamber of the cylinder bushing 172.

As will be seen from the drawing, the rotary piston housing 182 is provided with means for filling pressure fluid into and discharging the same from the rotary piston housing 182. The discharge valve 222 serves for discharging pressure fluid, whereas valve 223 is intended for shutting off conduit 224 which has interposed therein a pump 225 adapted to draw pressure fluid from a storage container and to feed the same into the interior of the drive system when said valve is open.

The rotary piston housing 182 is further provided with means for maintaining a constant maximum fluid pressure within the housing. Connected with the conduit 224*a* are a high pressure valve 222*a* and a low-pressure valve 223*a*. The high-pressure valve 222*a* will open, when a pre-determined maximum pressure has been attained, thus permitting fluid to flow into container 226*a*. The low-pressure valve 223*a* will be actuated when the minimum fluid pressure has fallen below a pre-determined value thus energizing pump 225*a* which will feed a corresponding amount of pressure fluid into the rotary piston housing 182.

Figure 18:
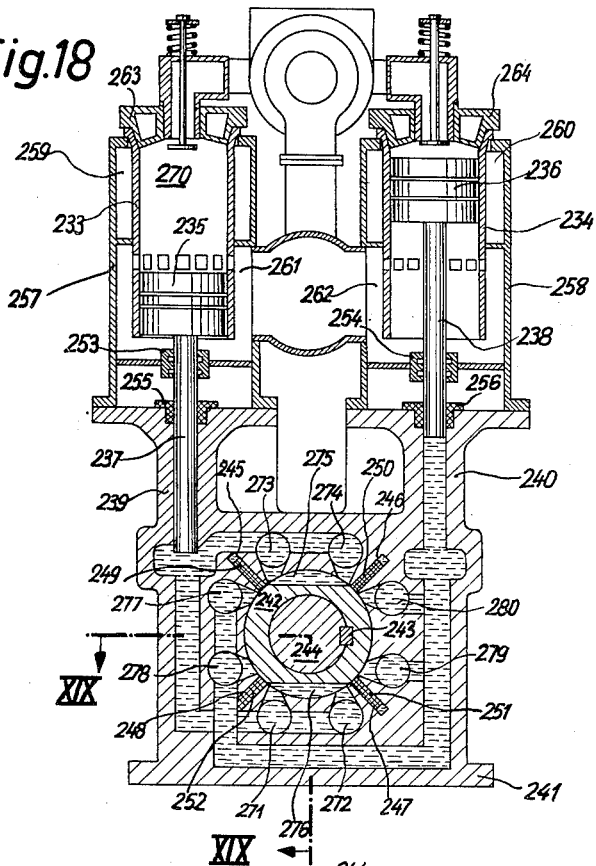
FIG. 18 is a transverse section through a two-cylinder group of a valve controlled two-stroke cycle diesel engine.
Figure 19:
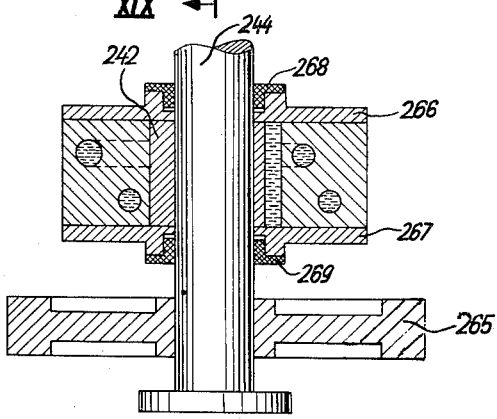
FIG. 19 represents a section along the line XIX—XIX of FIG. 18.

FIGS. 16 and 17 as well as FIGS. 18 and 19 illustrate supercharged ship diesel engines in which the charging pressure is always at least so high that the reciprocating piston will safely be pressed against the pressure fluid and a lifting off from the pressure fluid will be avoided. When starting such an engine by means of compressed air, however, it is possible that at the start of the movement one or more pistons of a multi-cylinder engine may occupy such a position that the starting air valve is already closed. When under such circumstances rotation of the rotary piston starts in view of the actuation by compressed air of some of the cylinder piston systems, there will be no assurance that also those pistons which are not acted upon by compressed air will quickly start their movement. In order to assure such quick starting movement, the reciprocable pistons 177 and 178 of the arrangement of FIGS. 16 and 17 are designed as differential pistons. These differential pistons form on their back side cylindrical chambers designated in FIG. 16 with the reference numerals 231 and 232. These chambers will during the starting of the engine likewise be placed under the effect of compressed air or a fluid under pressure so that a definite contact of the reciprocating pistons with the pressure fluid will be assured also during the starting operation. The supply of compressed air or fluid under pressure to the back side of the pistons 177 and 178 may be closed off after the engine has started. In particular instances, for instance in connection with a ship engine, the said chambers may be employed for producing compressed air for the starting air containing vessels.

The two cylinder groups illustrated in FIGS. 18 and 19 represent a portion of a supercharged uni-flow scavenged large two-stroke cycle ship diesel engine, preferably to be driven with heating oil.

With this embodiment, a rotary piston is employed the operation of which is the same as with the embodiment of FIGS. 10 and 12. With this embodiment, the connecting rods are designed as plungers.

Pistons 235 and 236 connected to connecting rods 237 and 238 are reciprocably mounted in the two cylinder bushings 233 and 234. The said connecting rods 237 and 238 form the plungers, i.e. the reciprocating pistons of the hydrostatic driving mechanism. The connecting rods 237 and 238 extend into the cylinders 239 and 240 which form a part of the housing 241 which latter also has journalled therein the rotary piston 242. The rotary piston 242 is keyed by a key 243 to the drive shaft 244. Furthermore, the housing 241 is provided with radial slits 245, 246, 247 and 248 in which are reciprocably mounted slides 249, 250, 251 and 252 which form sealing elements. Below the cylinder bushings 233 and 234 there are arranged the stuffing boxes 253 and 254 respectively which strip off the combustion residues of the heating oil from the connecting rods 237 and 238. The connecting rods 237 and 238 are additionally sealed with regard to the housing 241 by means of stuffing boxes 255 and 256. The cylinder bushings 233 and 234 are supported by members 257 and 258 the upper portion of which forms the cooling jackets 259 and 260 for the water cooling system, whereas the lower portions of said members 257 and 258 form the scavenging boxes 261 and 262 of the internal combustion engine. The bushings 233 and 234 are closed by the cylinder lids 263 and 264. For purposes of maintaining the required uniformity of the rotative movement, there is provided a fly wheel 265 which is keyed or otherwise connected to the input shaft 244. Said housing 241 which houses the connecting rods 237 and 238 and the rotary piston 242 has its sides closed by lids 266 and 267 provided with stuffing boxes 268 and 269 respectively for sealing the input shaft 244.

The input shaft may similar to the above described embodiments be journalled in any known manner.

*Operation of the Arrangement of FIGS. 18 and 19*

When an ignition is effected in the combustion chamber 270, the connecting rod or plunger 237 is pressed into the cylinder 239 by means of piston 235. The pressure fluid of this cylinder will then pass into the feeding lines 271, 272, 273 and 274 and will cause the rotary piston 242 to start its rotation. Inasmuch as with the illustrated embodiment, the rotary piston and the two pistons of the internal combustion engine occupy their dead center point positions, it is in this instance not definite in which direction the rotary piston will rotate. Therefore, the rotary movement must be initiated either by the fly wheel 265 or by another pair of cylinders and its direction must thus be determined. Assuming that the rotary movement is effected in a random direction, pressure fluid from pressure chambers 275 and 276 will through passages 277, 278, 279 and 280 be pressed into the cylinder 240. Thus, the connecting rod 238 will be displaced out of the cylinder 240 and together therewith, the piston 236 will be moved upwardly. In this way, the air charge will be compressed in the chamber formed by the bushing 237, piston 236 and cylinder lid 246.

According to the internal combustion engine illustrated in FIG. 20, pistons 287 and 288 reciprocate in cylinder bushings 281 and 282 arranged within the cylinder housings 283 and 284 and closed by cylinder lids 285 and 286. These pistons 287 and 288 are provided with plunger-like extensions 289 and 290 which extend into bores 291 and 292 provided in the rotary piston housing 293. The plunger-like extensions 289 and 290 are by means of seals 294 and 295 sealed against the rotary piston housing 293, and by means of seals 296 and 297 sealed against the scavenging boxes 298 and 299 of the cylinder housings 283 and 284. The rotary piston housing 293 has journalled therein an input shaft which is composed of three sections 300, 301 and 302 in conformity with the building block principle. The ends of the individual sections 300, 301 and 302 of the input shaft are provided with outer teeth 303, 304, 305 and 306. These teeth are crowned and the tooth heads are likewise arched. The outer teeth 303, 304, 305 and 306 cooperate with corresponding teeth of the coupling sleeves 307 and 308 adapted to interconnect the shaft sections 300, 301 and 302. The particular shape of the teeth permits a certain angular displacement and a certain axial displacement of the shaft sections 300, 301 and 302 relative to each other. The coupling sleeves 307 and 308 simultaneously serve as rotary pistons adapted to rotate in chambers 309 and 310 of the rotary piston housing 293. Between the walls of chambers 309 and 310 and the coupling sleeves 307 and 308 serving as rotary pistons, normally pressure chambers are formed which act parallel to each other. Of these pressure chambers, those visible in FIG. 20 communicate with each other through passages 311 and 312. Furthermore, the pressure chambers communicate through a passage 313 with a bore 314 extending transverse through the rotary piston housing 293. The pressure chambers which form during the rotation of the coupling sleeves 307 and 308 serving as rotary pistons and are offset by 90° to the previously mentioned pressure chambers, communicate with bores 314 through passages 315 and 316. A piston slide 317 slides in bore 314 while the pistons 318, 319 and 320 of said piston side or valve spool 317 tightly seal with the wall of the bore 314. When the piston slide or valve spool 317 occupies its full line position, bore 291 will communicate with passages 313 whereas bore 292 will communicate with passages 315 and 316. When the valve spool 317 occupies the position indicated by dash lines, bore 291 communicates with passages 315 and 316, whereas bore 292 communicates with passage 313. Guide wheel-like cooling elements 321 and 322 are built into the passages 315 and 316, cooling fluid being fed into and discharged from the said passages 315 and 316 through passages 323 and 324.

In this way, the pressure fluid moving back and forth between the plunger-like extensions 289 and 290 and the coupling sleeves 307 and 308 serving as rotary pistons will be cooled.

The cylinder lids 285 and 286 have respectively arranged therein valve housings 325 and 326 on which are mounted pressure cylinders 327 and 328. These pressure cylinders communicate through conduits 329 and 330 with bores 291 and 292 and, more specifically, the pressure cylinder 327 is through conduit 330 connected to bore 292, whereas the pressure cylinder 328 is connected through conduit 329 with bore 291.

Pistons 333 and 334 are adapted to reciprocate in pressure cylinders 327 and 328 against the thrust of springs 331 and 332, said pistons 333 and 334 forming parts of the valves 335 and 336. It is a matter of course that the springs 331 and 332 may also be replaced by suitable hydraulic means.

*Operation of the Arrangement According to FIG. 20*

When the plunger-like extension 290 moves downwardly with regard to FIG. 20, pressure fluid is displaced from bore 292 through conduit 330 into the pressure cylinder 327 whereby piston 333, when subjected to a certain liquid pressure, will open valve 335. Piston 334 will during the downward movement of the plunger-like extension 289 in bore 291 act upon valve 336 correspondingly.

When the valve spool 307 occupies the position shown in full lines, first during the downward movement of the extension 290, pressure fluid will be conveyed from bore 292 through passages 315 and 316 into the inner chambers of rotary piston housing 293. By moving the valve spool 317 into the position shown by dash lines, pressure fluid will during the downward movement of the extension 290 be pressed from bore 292 through passage 313 into the rotary piston housing 293. In this way, the direction of rotation of the input shaft 300 may be reversed with a certain piston movement.

As will be evident from the above, the present invention is particularly suitable for use in connection with large engines as for instance ship main engines which drive the ship propeller without transmission. Such engines will in conformity with the propeller speed for optium efficiency and in conformity with a certain medium piston speed ascertained by experience for continuous operation, have rather large dimensions and considerable weight when engines of high output are involved.

Aside from the space required for such a heavy engine, the installation of such an engine is rather difficult in view of the individual engine elements.

While it is true that when employing a crank drive heretofore known, the crank shaft may be subdivided, there are, however, limited possibilities only for such subdivision.

Particular difficulties are encountered when with a large engine damages to the crank shaft have to be repaired. If such repair requires a removal of the crank shaft, the entire engine has to be removed because the crank shaft is located in the lower portion of the engine. As a result thereof the ship is layed off for weeks and even months which, of course, represents a considerable loss in income. If the crank shaft breaks while the ship is on the high sea, also the main driving engine cannot be used, and the ship cannot be maneuvered and has to be towed in.

When employing the heretofore known crank drive, the building block principle can be employed only within rather narrow limits. In contrast thereto, the arrangement according to the present invention allows the application of the building block principle for the entire engine. This is furthermore favored by the fact that the rotary pistons of the arrangement according to the present invention are designed symmetrically and that the symmetrical rotary pistons on a simple shaft do not have to be balanced by counter weights.

It will furthermore be appreciated that the rotary pistons of the present invention can be mounted on the output shaft by plug socket couplings, for instance by a so-called arched tooth coupling as mentioned above. The number of teeth of the outer teeth of the output shaft and of the inner teeth of the rotary piston pertaining thereto is advantageously so selected that the individual rotary pistons can be offset with regard to each other for all possible numbers of cylinders and ignition series.

When employing axially yieldable couplings for connecting the rotary pistons and output shaft, it is possible that these elements change their length due to temperature variations without the rotary pistons rotating in the housing fixed to the base undergoing an axial displacement. This is of particular importance with large and long engines in view of the necessary lateral seals of the rotary pistons against the high fluid pressure.

The employment of an arrangement according to the invention yields further advantages, particularly with large engines.

Thus, the addition or disconnection of a cylinder is possible in a most simple manner by merely discharging or supplying pressure fluid from and to the respective cylinder. The disconnection is advantageously effected automatically by directly or indirectly controlled quick closing valves, for instance in such a manner that by means of a contact manometer or contact themometer mounted on an appropriate station an electromagnetic compressed air valve is controlled and that the thus controlled compressed air acts upon a quick closing valve for the fluid. A seizing or jamming of pistons will then be impossible for all practical purposes because the contact manometer would in proper time shut off or disconnect an endangered cylinder unit. This greatly increases the safety of operation of the engine and simplifies the servicing thereof. Furthermore, crank case explosions cannot occur any longer because of the absence of hollow chambers filled with oil vapors.

When employing a rotary piston in which one complete revolution corresponds to two or more working cycles of the reciprocable pistons associated therewith, a step-down transmission ratio of the output shaft will be obtained. This is equivalent to a reduction of the power weight ratio at a certain output speed. In many instances, for instance with main engines for ships, this represents a great advantage. With engines which run at a higher speed than the propeller, it is thus possible to save very expensive transmissions for high outputs which transmissions are moreover liable to disturbances.

Furthermore, even with diesel engines a very calm and balanced running performance can be obtained. Due to the compressibility of the pressure fluid which is present, even though to a minor extent, the ignition blow, which is particularly disagreeable with diesel engines, will be cushioned to a considerable extent.

When combining a piston operated internal combustion engine with a driving mechanism according to the present invention, it is important that during the operation and prior to the start a certain coordination of the position of the reciprocable pistons and rotary pistons be assured. Inasmuch as a mechanical connection between these pistons is lacking and the uniform running operation may be affected by losses in the liquid and by changes in the temperature of the liquid power transmitting medium, as for instance changes in temperature in the structural elements containing liquid power transmitting medium, the automatic compensation of the change in volume of the pressure fluid is of particular importance. Such automatic compensation may be carried out by mechanical control means, which are acted upon by the reciprocable piston as well as by the rotary piston, and by electric or electromechanical control means adapted to control the oil compensation.

It is, of course, to be understood that the present invention is, by no means, limited to the particular constructions shown in the drawings but also comprises any modifications within the scope of the appended claims.

What I claim is:

1. In an arrangement for converting a reciprocatory movement into a rotary movement and vice versa: a reciprocable element, first displacement means operatively connected to said reciprocable element for reciprocation therewith, cylinder means adapted to be filled with fluid and reciprocably receiving said first displacement means, a rotatable machine element, second displacement means, housing means receiving said second displacement means, one of said last mentioned two means being rotatable relative to the other one and being operatively connected to said rotatable machine element, said last mentioned two means together confining chamber means and conduit means establishing fluid communication between said chamber means and said cylinder means, said conduit means including branch conduits respectively leading into said chamber means so as to cause pressure fluid displaced by said first displacement means into said chamber means to subject said rotatable means to opposite radial forces substantially balancing each other.

2. In an arrangement for converting a reciprocatory movement into a rotary movement and vice versa: a reciprocable element, reciprocable displacement means operatively connected to said reciprocable element, cylinder means adapted to be filled with fluid and reciprocably receiving said reciprocable displacement means, a rotatable machine element, rotatable displacement means operatively connected to said rotatable machine element, housing means rotatably receiving said rotatable displacement means, movable sealing members radially slidable in one of said last mentioned two means and in continuous engagement with the other one of said last mentioned two means, said rotatable displacement means and said housing means together with said movable sealing members confining chamber means alternately increasing and decreasing in volume in response to the rotation of said rotatable displacement means, and conduit means establishing fluid communication between said chamber means and said cylinder means, said conduit means including branch conduits respectively leading into said chamber means so as to cause pressure fluid displaced by said reciprocable displacement means into said chamber means to subject said rotatable displacement means to opposite radial forces substantially balancing each other.

3. An arrangement according to claim 2, in which the chamber means communicating through said branch conduits with said cylinder means form the corners of an equilateral polygon.

4. An arrangement according to claim 2, in which said branch conduits have those portions thereof which lead into said chamber means located in the same means in which said sealing members are radially slidable.

5. In an arrangement for converting a reciprocatory movement into a rotary movement and vice versa: a plurality of parallely effective reciprocable piston means, a plurality of cylinder means adapted to be filled with fluid and respectively receiving said reciprocable piston means, a rotatable machine element, rotatable displacement means, housing means receiving said rotatable displacement means, one of said last mentioned two means being rotatable relative to the other and being operatively connected to said rotatable machine element, said last mentioned two means together confining chamber means, and conduit means establishing fluid communication between said chamber means and said cylinder means, said conduit means including branch conduits respectively leading into said chamber means so as to cause pressure fluid displaced by said first displacement means into said chamber means to subject said rotatable means to opposite radial forces substantially balancing each other.

6. In an arrangement for converting a reciprocatory movement into a rotary movement and vice versa: a reciprocable element, first displacement means operatively connected to said reciprocable element, cylinder means adapted to be filled with fluid and reciprocably receiving said first displacement means, a rotatable machine element, a plurality of second displacement means, housing means receiving said second displacement means, said second displacement means and said housing means being rotatable relative to each other and being operatively connected to said rotatable machine element, said second displacement means and said housing means together confining chamber means, and conduit means establishing fluid communication between said chamber means and said cylinder means, said conduit means including branch conduits respectively leading into said chamber means so as to cause pressure fluid displaced by said first displacement means into said chamber means to subject that one of the housing means and second displacement means which is rotatable to opposite radial forces substantially balancing each other.

7. In an arrangement for converting a reciprocatory movement into a rotary movement and vice versa: fluid operable reciprocable displacement means, cylinder means adapted to be filled with fluid and reciprocably receiving said reciprocable displacement means, a rotatable machine element, rotatable displacement means operatively connected to said rotatable machine element, housing means rotatably receiving said rotatable displacement means and confining therewith chamber means alternately increasing and decreasing in volume in response to the rotation of said rotatable displacement means, and conduit means establishing fluid communication between said chamber means and said cylinder means, said conduit means including branch conduits leading into said chamber means so as to cause pressure fluid displaced by said reciprocable displacement means into said chamber means to opposite axial forces substantially balancing each other.

8. In an arrangement for converting a reciprocatory movement into a rotary movement and vice versa: a plurality of parallelly effective reciprocable piston means, a plurality of cylinder means adapted to be filled with fluid and respectively receiving said reciprocable piston means, a rotatable machine element, rotatable displacement means, housing means receiving said rotatable displacement means, one of said last mentioned two means being rotatable relative to the other and being operatively connected to said rotatable machine element, said last mentioned two means together confining chamber means, conduit means establishing fluid communication between said chamber means and said cylinder means, said conduit means including branch conduits respectively leading into said chamber means, and means associated with said conduit means and operable selectively to reverse the communication between said cylinder means and the respective chamber means to thereby reverse the direction of rotation of said rotatable displacement means.

9. In an internal combustion engine: two internal combustion cylinders arranged in axial alignment with regard to each other, two pistons respectively reciprocably arranged in said internal combustion cylinders, a fluid cylinder arranged in axial alignment with said internal combustion cylinders and adapted to receive fluid, connecting rod means interconnecting said pistons and extending into said fluid cylinder, a fluid operable double acting piston reciprocably mounted in said fluid cylinder and connected to said connecting rod means, housing means, rotatable displacement means rotatably mounted in said housing means and confining therewith oppositely arranged chamber means adapted alternately to increase and decrease in volume in response to the rotation of said rotatable displacement means, and conduit means respectively leading from said fluid cylinder from opposite sides of said fluid operable piston into said chamber means so that the radial forces exerted by fluid under pressure conveyed from said fluid cylinder to said chamber means and acting upon said rotatable displacement means will substantially balance each other.

10. In an internal combustion engine: two internal combustion cylinders arranged in axial alignment with regard to each other, two pistons respectively reciprocably arranged in said internal combustion cylinders, a fluid cylinder arranged in axial alignment with regard to said internal combustion cylinders and adapted to receive fluid, connecting rod means interconnecting said pistons and extending into said fluid cylinder, a fluid operable double acting piston reciprocably mounted in said fluid cylinder and connected to said connecting rod means, housing means, rotatable displacement means rotatably mounted in said housing means, slide means reciprocably mounted in one of said last mentioned two means and said rotatable displacement means, a plurality of chamber means alternately increasing and decreasing in volume in response to the rotation of said rotatable displacement means in said housing means, and conduit means respectively leading from said fluid cylinder at opposite sides of said fluid operable piston to said chamber means, the arrangement being such that those chamber means which receive pressure fluid displaced by one side of said fluid operable piston form the corners of one equilateral polygon, whereas the other chambers which receive pressure fluid displaced by the other side of the double acting fluid operable piston form the corners of another equilateral polygon, said last mentioned polygon being offset with regard to the first mentioned polygon by an angle corresponding to the number of said chamber means.

11. In an internal combustion engine having reciprocable piston means and first cylinder means pertaining thereto, valve means respectively associated with said first piston means, fluid operable actuating means for actuating said valve means, first fluid displacement means operatively connected to said reciprocable piston means, second cylinder means adapted to be filled with fluid and reciprocably receiving said first fluid displacement means, a rotatable machine element, second fluid displacement means, housing means receiving said second fluid displacement means, one of said last mentioned two means being rotatable relative to the other and being operatively connected to said rotatable machine element, said last mentioned two means confining with each other chamber means alternately increasing and decreasing in volume in response to the rotation of said rotatable machine element, conduit means establishing fluid communication between said chamber means and said second cylinder means, said conduit means including branch conduits leading into said chamber means so as to cause pressure fluid displaced by said first fluid displacement means into said chamber means to subject said rotatable means to opposite radial forces substantially balancing each other, and additional conduit means communicating with said first mentioned conduit means and leading to said fluid operable actuating means for actuating said valve means.

12. An arrangement according to claim 11, in which said first cylinder means is provided with cooling jacket means communicating with said first mentioned conduit means.

13. In an internal combustion engine having reciprocable piston means and first cylinder means pertaining thereto, fuel injection means respectively associated with said first piston means, fluid operable actuating means for actuating said fuel injection means, first fluid displacement means operatively connected to said reciprocable piston means, second cylinder means adapted to be filled with fluid and reciprocably receiving said first fluid displacement means, a rotatable machine element, second fluid displacement means, housing means receiving said second fluid displacement means, one of said last mentioned two means being rotatable relative to the other and being operatively connected to said rotatable machine element, said last mentioned two means confining with each other chamber means alternately increasing and decreasing in volume in response to the rotation of said rotatable machine element, conduit means establishing fluid communication between said chamber means and said second cylinder means, said conduit means including branch conduits leading into said chamber means so as to cause pressure fluid displaced by said first fluid displacement means into said chamber means to subject said rotatable means to opposite radial forces substantially balancing each other, and additional conduit means communicating with said first mentioned conduit means and leading to said fluid operable actuating means for actuating said fuel injection means.

14. In an arrangement for converting a reciprocatory movement into a rotary movement and vice versa: a reciprocable element, first displacement means operatively connected to said reciprocable element, cylinder means adapted to be filled with fluid and reciprocably receiving said first displacement means, a rotatable machine element, second displacement means, housing means receiving said second displacement means, one of said last mentioned two means being rotatable relative to the other, plug coupling means connecting said rotatable means to said rotatable machine element, said plug coupling means being operable to vary the angular relationship between said rotatable means and said rotatable machine element, said rotatable means and said housing means together confining chamber means alternately increasing and decreasing in volume in response to the rotation of said rotatable means, and conduit means establishing fluid communication between said chamber means and said cylinder means, said conduit means including branch conduits respectively leading into said chamber means so as to cause pressure fluid displaced by said first displacement means into said chamber means to subject said rotatable means to opposite radial forces substantially balancing each other.

15. An arrangement according to claim 1, in which said rotatable machine element forms a sectional shaft and in which plug coupling means are provided interconnecting said sections of said shaft, parts of said plug coupling means being formed by said rotatable means.

References Cited in the file of this patent

UNITED STATES PATENTS

| | | |
|---|---|---|
| 1,000,410 | Howell | Aug. 15, 1911 |
| 1,300,666 | Spencer | Apr. 15, 1919 |
| 2,326,821 | Boyle | Aug. 17, 1943 |
| 2,507,151 | Gabriel | May 9, 1950 |
| 2,658,486 | De Waide | Nov. 10, 1953 |
| 2,821,840 | Hays | Feb. 4, 1958 |
| 2,880,572 | Fawcett et al. | Apr. 7, 1959 |
| 2,882,685 | Carlsen et al. | Apr. 21, 1959 |

FOREIGN PATENTS

| | | |
|---|---|---|
| 345,667 | Great Britain | Mar. 23, 1931 |